US008853889B2

(12) United States Patent
Suzuki et al.

(10) Patent No.: US 8,853,889 B2
(45) Date of Patent: Oct. 7, 2014

(54) COMMUNICATION TERMINAL APPARATUS AND METHOD FOR SUPPLYING TERMINAL POWER SOURCE

(75) Inventors: Kuniharu Suzuki, Tokyo (JP); Katsuya Suzuki, Gunma (JP)

(73) Assignees: Sony Corporation, Tokyo (JP); Sony Mobile Communications Inc., Tokyo (JP)

( * ) Notice: Subject to any disclaimer, the term of this patent is extended or adjusted under 35 U.S.C. 154(b) by 430 days.

(21) Appl. No.: 13/050,624

(22) Filed: Mar. 17, 2011

(65) Prior Publication Data

US 2012/0056497 A1 Mar. 8, 2012

Related U.S. Application Data

(60) Provisional application No. 61/380,922, filed on Sep. 8, 2010.

(51) Int. Cl.
H01F 27/42 (2006.01)
H01F 37/00 (2006.01)
H01F 38/00 (2006.01)
H02J 7/00 (2006.01)

(52) U.S. Cl.
USPC .......................... 307/104; 320/108

(58) Field of Classification Search
CPC ................. H02J 7/025; H02J 5/005
USPC .................... 307/104; 320/108; 455/41.2
See application file for complete search history.

(56) References Cited

U.S. PATENT DOCUMENTS

| 7,793,121 | B2 * | 9/2010 | Lawther et al. ............... 713/300 |
| 8,116,681 | B2 * | 2/2012 | Baarman ...................... 455/41.1 |
| 8,155,688 | B2 * | 4/2012 | Kim et al. ..................... 455/522 |
| 2005/0151511 | A1 * | 7/2005 | Chary .......................... 320/127 |
| 2006/0264197 | A1 * | 11/2006 | Mahini et al. ............... 455/343.5 |
| 2010/0052431 | A1 * | 3/2010 | Mita ............................. 307/104 |
| 2010/0119000 | A1 * | 5/2010 | Kim et al. .................... 375/260 |

FOREIGN PATENT DOCUMENTS

| JP | 2009-148151 | 7/2009 |
| JP | 2010-63245 | 3/2010 |

OTHER PUBLICATIONS

English machine translation of JP,2009-148151.*
U.S. Appl. No. 13/078,624, filed Apr. 1, 2011, Suzuki, et al.
U.S. Appl. No. 13/349,966, filed Jan. 13, 2012, Suzuki.

* cited by examiner

Primary Examiner — Rexford Barnie
Assistant Examiner — Rasem Mourad
(74) Attorney, Agent, or Firm — Oblon, Spivak, McClelland, Maier & Neustadt, L.L.P.

(57) ABSTRACT

A communication terminal that includes a wireless communication unit used to communicate with another communication terminal, a power transmitting unit that transmits contactless electric power to the another communication terminal, and a control unit that controls the wireless communication unit to transmit, to the another communication terminal, an instruction for receiving the contactless electric power transmitted from the power transmitting unit.

17 Claims, 12 Drawing Sheets

FIG. 5

```
090-1234-5678
TARO

TO TARO
DONATE A BATTERY CAPACITY OF 100 mAh
```

FIG. 6

```
REMAINING CAPACITY OF THIS MOBILE PHONE IS
30% OR LESS.  DO YOU STILL DONATE?

YES/NO
```

COMMUNICATION TERMINAL APPARATUS AND METHOD FOR SUPPLYING TERMINAL POWER SOURCE

CROSS REFERENCE TO RELATED APPLICATION

The present application claims the benefit of the earlier filing date of U.S. Provisional Patent Application Ser. No. 61/380,922 filed on Sep. 8, 2010, the entire contents of which is incorporated herein by reference.

BACKGROUND OF THE INVENTION

1. Field of the Invention

The present invention relates to a communication terminal apparatus to be applied to a terminal provided with a wireless communication function, such as a mobile phone terminal apparatus, and also relates a method for supplying a terminal power source, which can be applied to such a communication terminal apparatus. In particular, the present invention relates to a technology for supplying electric power to a terminal apparatus using a contactless charging function.

2. Description of the Related Art

In recent years, a charging apparatus or the like has been provided for supplying electric power to a separate terminal apparatus in a contactless state with no connection of a power-supplying terminal or the like to supply electric power to the inner secondary battery of the terminal apparatus.

Heretofore, an electromagnetic induction system has been known as a system for contactless power transmission. According to such a system, a power-transmitting coil is arranged on an apparatus on a power-transmitting side and a power-receiving coil is arranged on an apparatus on a power-receiving side. Then, the portion of the apparatus on the transmission-side, on which the power-transmitting coil is arranged, is brought near to the portion of the apparatus on the power-receiving side, on which the power-receiving coil is arranged. Thus, these coils are brought into magnetic flux connection to allow them to perform power transmission in a contactless manner.

For example, as shown in FIG. 13, a power-transmitting coil 11 is arranged on a terminal apparatus 10a and a power-receiving coil 12 is arranged on another terminal apparatus 10b. Furthermore, like the state shown in FIG. 13, the power-receiving coil 12 of the terminal apparatus 10b is allowed to receive the electric power from the power-transmitting coil 11 of the terminal apparatus 10a in proximity to each other.

In the terminal apparatus 10b on the power-receiving side, the received power can be provided for charging the inner secondary battery of the terminal apparatus 10b or the operation of the terminal apparatus 10b.

The electromagnetic method has been known as a technology for contactless power transmission. However, it can transmit electric power only between apparatuses just proximal to each other because of a transmissible range of several millimeters. Therefore, the application of the electromagnetic induction type is limited to some of apparatuses, such as a water-proof type terminal, which is difficult to expose its charging terminal.

In recent years, as an alternative system for effectively supplying electric power to a terminal apparatus located at some distance, a so-called magnetic resonance system has been developed, proceeding toward practical use. In this system, an LC circuit, which includes a coil and a conductor, is installed in each of the power-transmitting side apparatus and the power-receiving side apparatus. A combination of the LC circuits on the respective apparatuses causes resonance of electric field/magnetic field between them to perform wireless transmission of electric power. In order to produce resonance of electric field/magnetic field between their circuits, their frequencies are kept equal to each other.

In the case of the magnetic resonance method, it is possible to attain a short-distance transmission of from about several centimeters to several meters. Furthermore, if there are two or more power-receiving side apparatuses within a power transmittable area, a single apparatus on the power-transmitting side may transmit electric power simultaneously to two or more apparatuses on the power-receiving side.

For example, as shown in FIG. 14, three terminal apparatuses 20a, 20b, and 20c are located in close proximity to one another. The terminal apparatus 20a is provided with a magnetic resonance type power-transmitting coil 21 and the terminal apparatuses 20b and 20c are provided with magnetic resonance type power-transmitting coils 22, respectively. Two terminal apparatuses 20b and 20c are arranged in the power transmissible area Ap of the terminal apparatus 20a.

Under such conditions, if three terminal apparatuses 20a, 20b, and 20c have the same resonant frequency, the single terminal apparatus 20a sends electric power simultaneously to two terminal apparatuses 20b and 20c. However, each of the terminal apparatuses 20b and 20c can receive almost half the power, compared with one received by a single terminal apparatus.

Japanese Unexamined Patent Application Publication No. 2010-63245 describes the supply of power by a magnetic resonance method in which a power-receiving side is selected from candidate apparatuses with reference to their resonant frequencies.

Japanese Unexamined Patent Application Publication No. 2009-148151 describes the application of contactless charge to a wireless communication terminal apparatus.

SUMMARY OF THE INVENTION

A comparatively wide power transmissible area may be defined to perform magnetic resonance power transmission. As shown in FIG. 14, electric power can be transmitted to all the terminal apparatuses provided with power-receiving coils in the power transmissible area. In some situations, however, the user using the terminal apparatus on the power-transmitting side intends to transfer intends to transmit electric power to only a certain terminal apparatus.

For example, in some situations, the user intends to transfer electric power from the terminal apparatus 20a to the terminal apparatus 20b but not to another terminal apparatus 20c in the same power transmissible area Ap. Specifically, for example, if one user possesses two terminal apparatuses 20a and 20b and a nearby terminal apparatus 20c belongs to another user and the remaining power of the battery in the terminal apparatus 20b decreases, the user intends to transmit electric power from the terminal apparatus 20a to the terminal apparatus 20b using the battery in the terminal apparatus 20a. In this case, however, undesired transmission of electric power to another terminal apparatus 20c also occurs. Therefore, the terminal apparatus 20b becomes difficult to receive a sufficient amount of electric power as expected.

As described in Japanese Unexamined Patent Application Publication No. 2010-63245, the setup of resonant frequency allows the user to selectively transmit electric power to only the specific terminal apparatus. However, if there are two or more terminal apparatuses with the same resonant frequency in the neighborhood, such a kind of the selection may be difficult.

It is desirable to overcome the aforementioned problem caused when performing contactless power transmission between terminal apparatuses.

Any embodiment of the present invention is applied to contactless transmission of electric power from a first communication terminal apparatus to a second communication terminal apparatus.

First, wireless communication is performed from the first communication terminal apparatus to the second communication terminal apparatus directly or via a base station. Then, the first communication terminal apparatus instructs the second communication terminal apparatus of conditions about transmission of electric power.

Subsequently, the first communication terminal apparatus performs contactless transmission of electric power under the conditions which have been instructed. Then, the second communication terminal apparatus, which has received the instruction, performs a process for power reception where electric power is received in a contactless manner under the conditions obtained by the received instruction.

Therefore, the transmission of electric power is started under the conditions instructed by the first communication terminal apparatus. Only the second communication terminal apparatus, where power reception is performed under the specified conditions, is allowed to receive the electric power. Consequently, contactless power transmission is established between the specified terminal apparatuses.

According to any of the embodiments of the present invention, the transmission and reception of electric power can be performed under the conditions specified via wireless communication when contactless power transmission is performed between the terminal apparatuses. Thus, contactless power transmission can be performed only between the specified terminal apparatuses. Therefore, even in the presence of many neighboring apparatuses which are capable of contactless power transmission, the user can establish intended contactless power transmission between specified terminal apparatuses.

BRIEF DESCRIPTION OF THE DRAWINGS

FIG. 5 is an explanatory diagram showing an exemplary display at the time of the power transmission according to the first embodiment of the present invention;

FIG. 6 is an explanatory diagram showing an exemplary display during the power transmission according to the first embodiment of the present invention;

DESCRIPTION OF THE PREFERRED EMBODIMENTS

Figure 1:
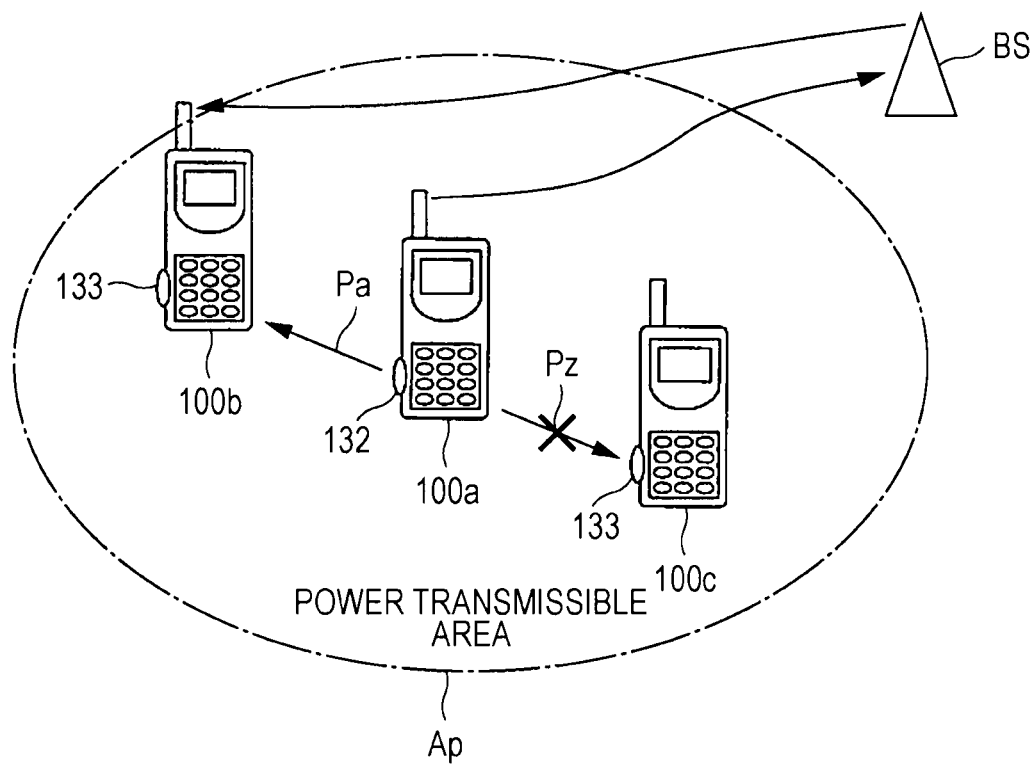
FIG. 1 is an explanatory diagram illustrating exemplary system configuration and operation status according to a first embodiment of the present invention.
Figure 2:
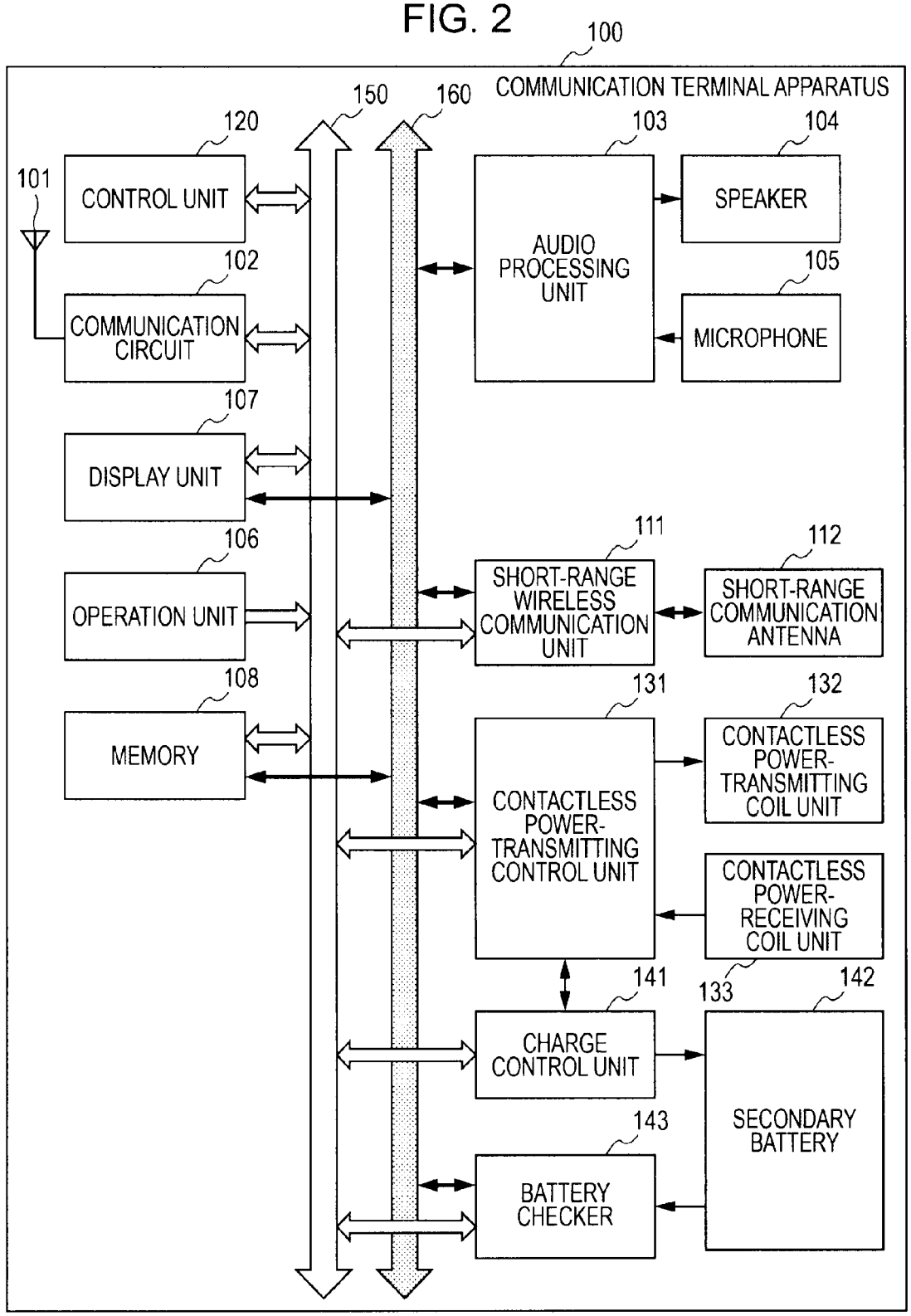
FIG. 2 is a block diagram illustrating an exemplary inner configuration of a terminal apparatus according to the first embodiment of the present invention.
Figure 3:
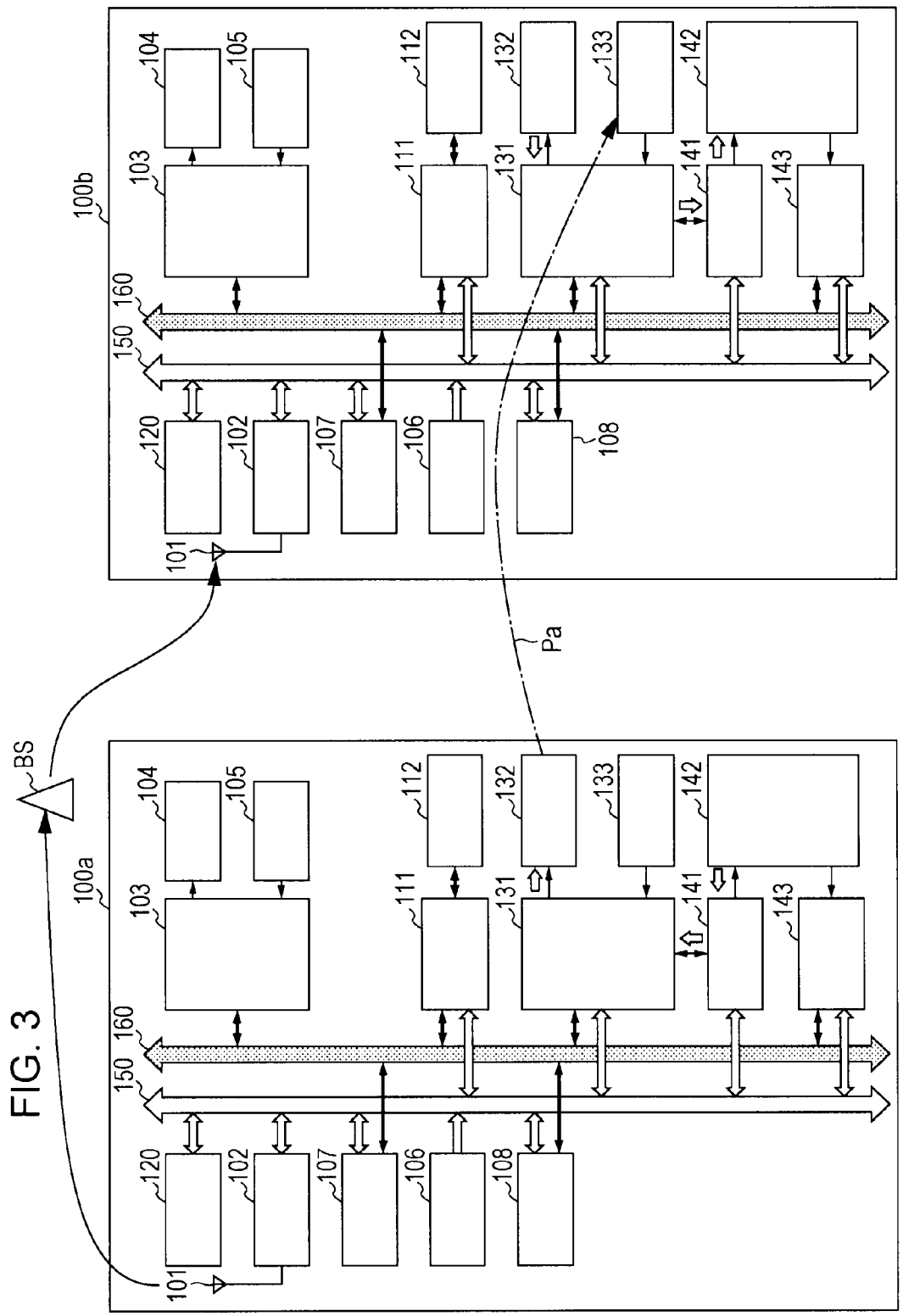
FIG. 3 is an explanatory diagram illustrating a power transmission state using two terminal apparatuses according to the first embodiment of the present invention.
Figure 4:
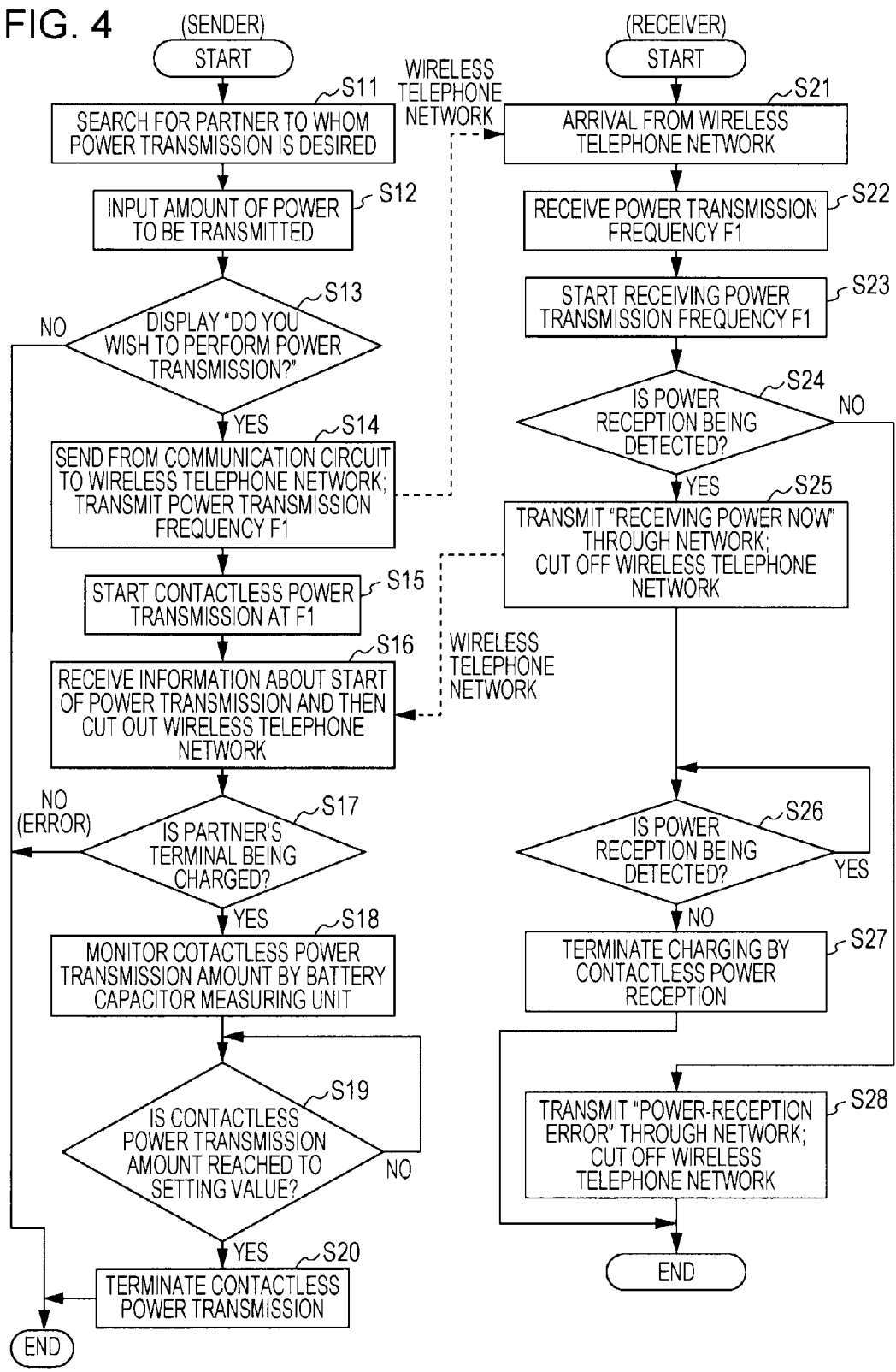
FIG. 4 is a flow chart illustrating an example of a process for power transmission according to the first embodiment of the present invention.
Figure 7:
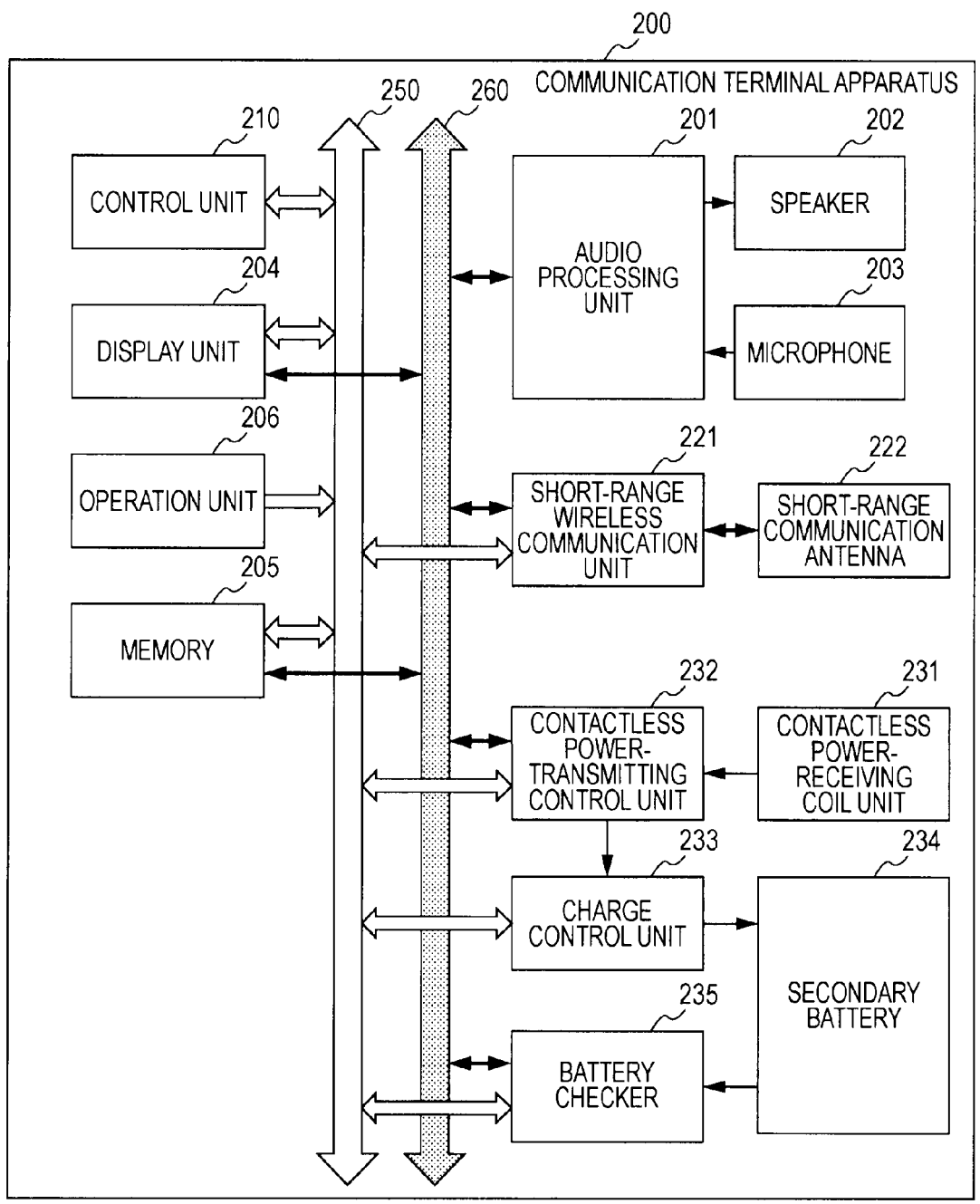
FIG. 7 is an explanatory diagram illustrating an exemplary inner configuration of a head set according to a second embodiment of the present invention.
Figure 8:
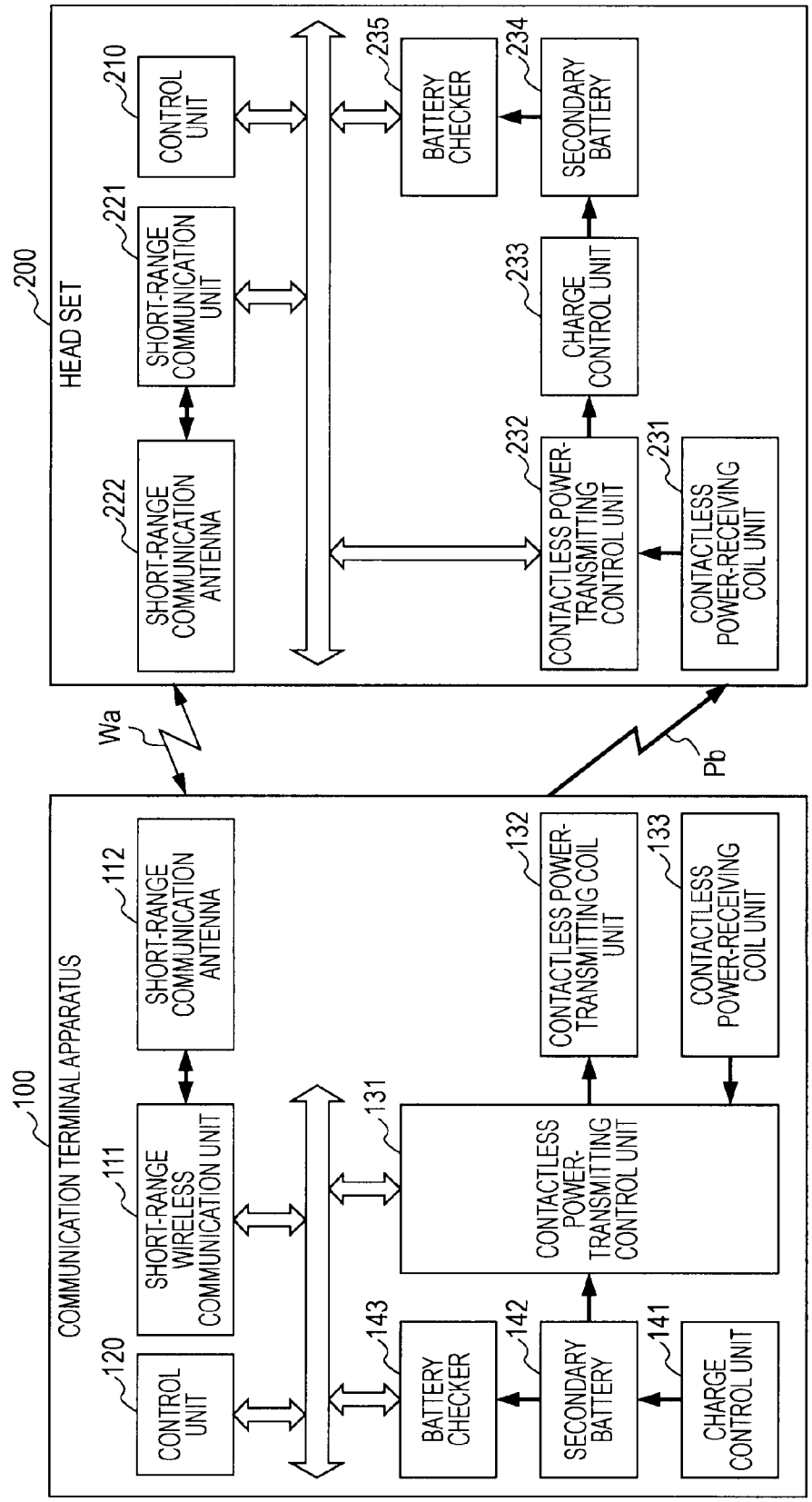
FIG. 8 is an explanatory diagram illustrating a power transmission state between the terminal apparatus and the head set according to the second embodiment of the present invention.
Figure 9:
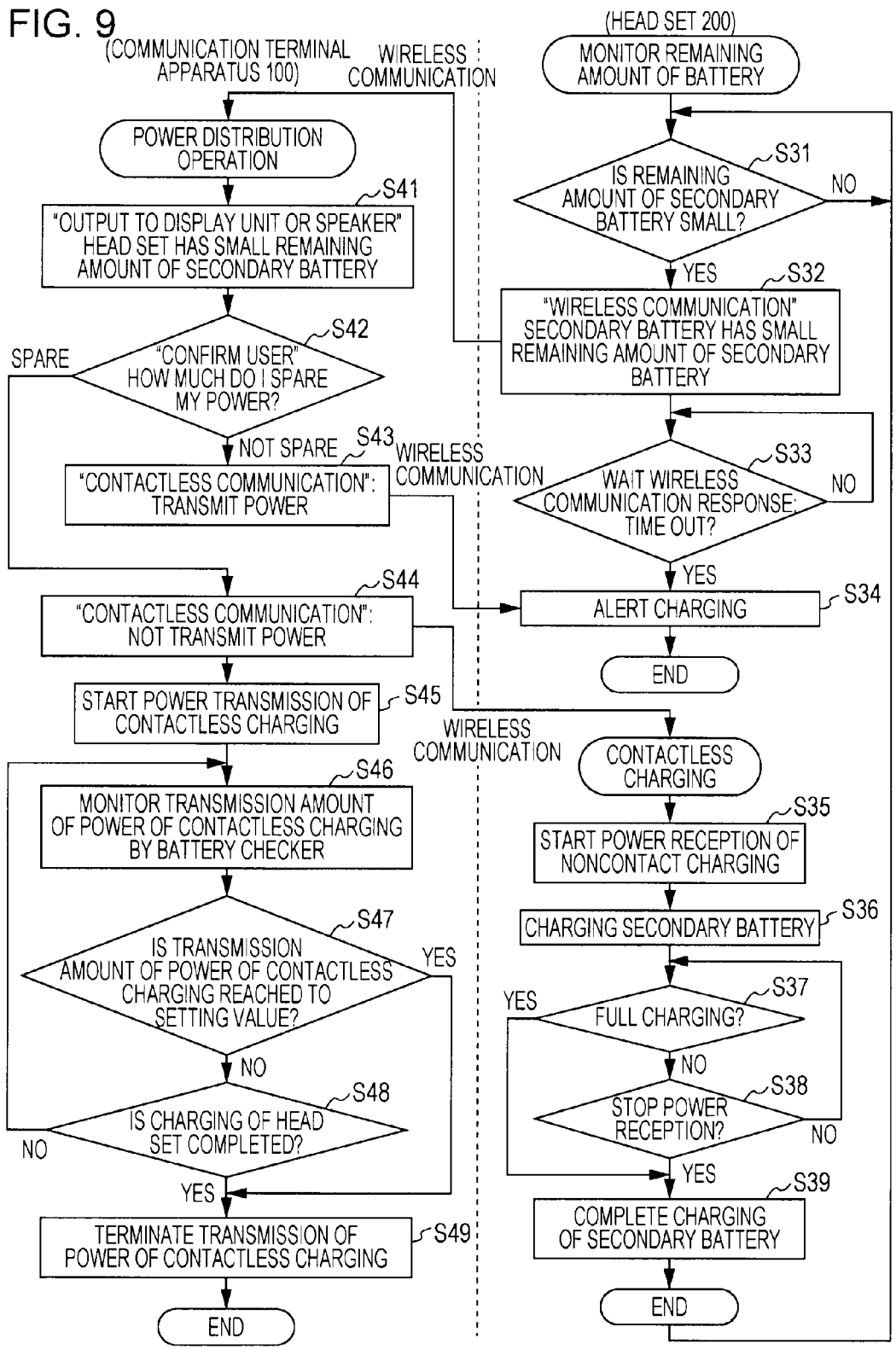
FIG. 9 is a flow chart illustrating an example of a process for power transmission according to the second embodiment of the present invention.

Hereafter, embodiments of the present invention will be described with reference to accompanying drawings in the following order:

1.1. Principle of process performed in first embodiment (FIG. 1);

1.2. Exemplary configuration of terminal apparatus according to first embodiment (FIG. 2 and FIG. 3);

1.3. Exemplary process for power transmission performed between two or more terminal apparatuses in first embodiment (FIG. 4, FIG. 5, and FIG. 6);

2.1. Exemplary configuration of head set according to second embodiment (FIG. 7);

2.2. Exemplary process of second embodiment (FIG. 8 and FIG. 9)

Figure 10:
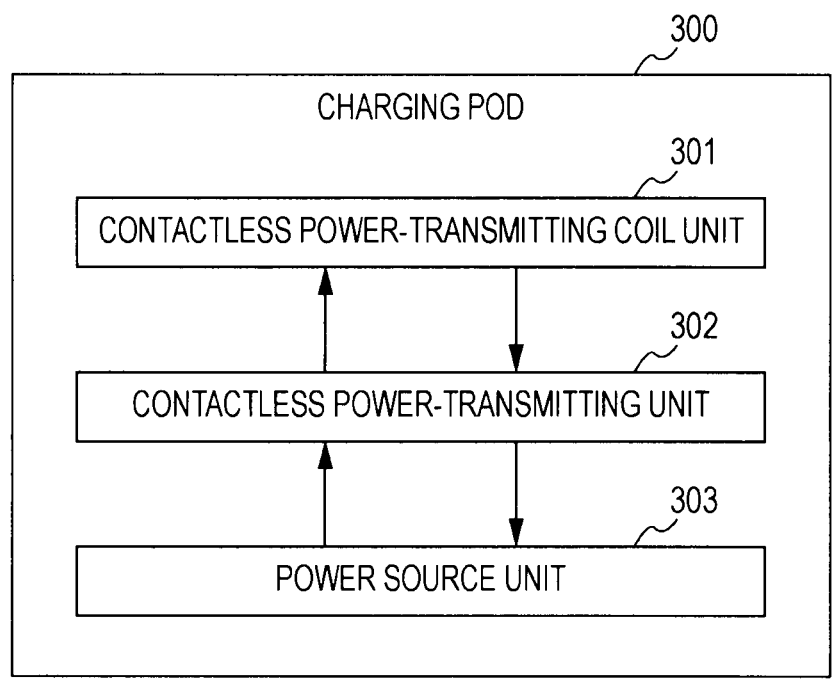
FIG. 10 is a block diagram illustrating an exemplary inner configuration of a charging pod according to a third embodiment of the present invention.

2.3. Exemplary configuration of charge stand of third embodiment (FIG. 10);

3. Exemplary configuration of third embodiment (FIGS. 11); and

Figure 12:
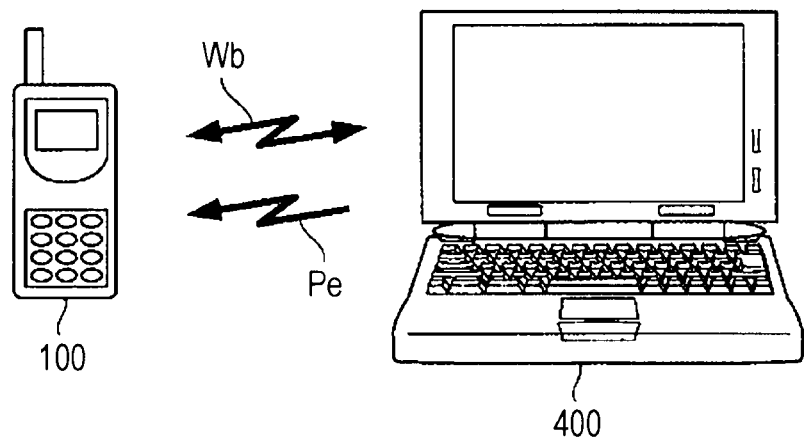
FIG. 12 is an explanatory diagram illustrating the outline of power transmission state according to any embodiment of the present invention.
Figure 13:
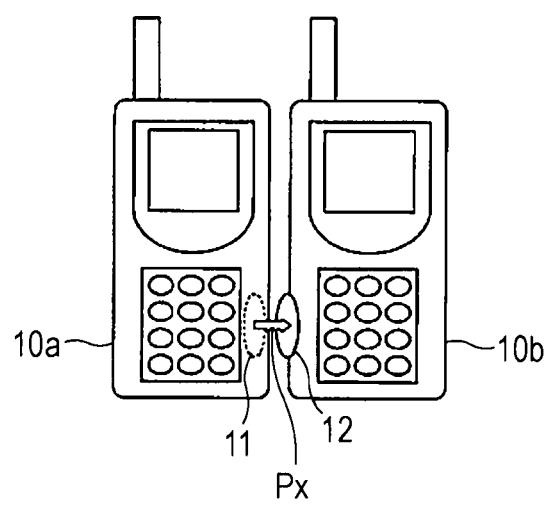
FIG. 13 is an explanatory diagram illustrating an example of power transmission using a typical electromagnetic induction system.
Figure 14:
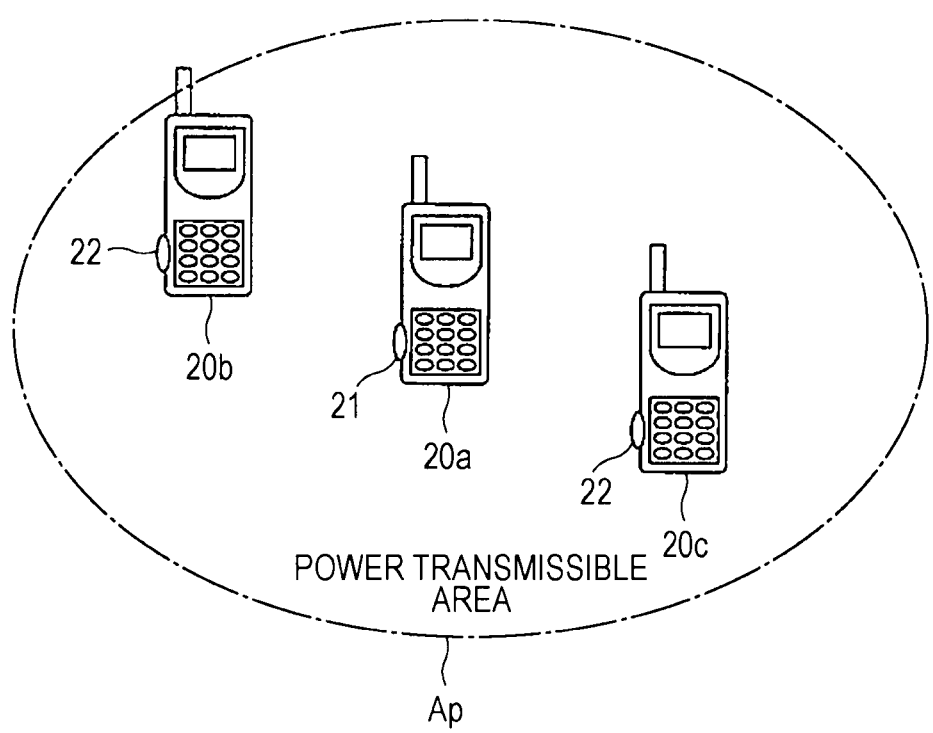
FIG. 14 is an explanatory diagram illustrating an example of power transmission using a typical magnetic resonance system.

4. Modified example (FIG. 12).

[1.1. Principle of Process Performed in First Embodiment]

First, the principle for a process for contactless power transmission between terminal apparatuses according to a first embodiment of the present invention will be described with reference to FIG. 1.

In the present embodiment, contactless power transmission is designed to perform power supply based on a magnetic resonance system. FIG. 1 illustrates three communication terminal apparatuses 100a, 100b, and 100c. Basically, these communication terminal apparatuses 100a, 100b, and 100c are designed to be wireless communication terminals having the same configuration so that they can perform wireless communication with a wireless communication base station BS. Then, a telephone line is established between the terminal apparatuses of communication parties through the base station Bs or the like. Although the base station BS is connected to a communication control center through a wireless telephone network transmission line and controls wireless communication between the base station BS and each wireless communication terminal.

In the example shown in FIG. 1, three communication terminal apparatuses 100a, 100b, and 100c are capable of power reception and power transmission. Among them, a single communication terminal device 100a is used as one on the power-transmitting side, which transmits power stored in a secondary battery installed on the terminal apparatus. Furthermore, the communication terminal apparatus 100b receives electric power transmitted from the communication terminal apparatus 100a and is then used as a terminal on the power-receiving side to charge the secondary battery.

Therefore, the communication terminal apparatus 100b on the power-receiving side is located on a power transmissible area Ap where the communication terminal apparatus 100a can transmit electric power to the communication terminal apparatus 100b. In addition, the communication terminal device 100c is also present in the communication transmissible area Ap.

In the present invention, the communication terminal apparatus 100a on the power-transmitting end and the communication terminal apparatus 100b on the power-receiving end are designed to carry out data transmission using a wireless communication network through the base station BS to allow the transmission side to perform power transmission under specified conditions. In addition, the power-receiving side is also designed to perform power reception. Here, the conditions to be specified from the power-transmitting side include resonant frequencies setup by the power-transmitting coil 132 and the power-receiving coil 133. Therefore, each communication terminal apparatuses 100a, 100b, and 100c are designed so that they can change their respective resonant frequencies when performing contactless power.

As described above, the resonant frequency of the communication terminal apparatus 100a on the power-transmitting side is set to be equal to the resonant frequency of the communication terminal apparatus 100b to allow the communication terminal apparatus 100a to transmit electric power to the communication terminal apparatus 100b in a contactless manner (i.e., contactless power transmission Pa).

In addition, another communication terminal apparatus 100c does not have a specified resonant frequency. Thus, any specified resonant frequency is not defined and contactless power transmission Pz is not performed. Therefore, selective contactless power transmission is performed among the communication terminal apparatuses 100a, 100b, and 100c.

[1.2. Terminal Device Exemplary Configuration of First Embodiment]

Referring now to FIG. 2 and FIG. 3, the configuration of an exemplary communication terminal apparatus according to the present invention will be described.

FIG. 2 is a block diagram illustrating an exemplary internal configuration of a communication terminal apparatus 100 as an example of the present embodiment. The communication terminal apparatus shown in FIG. 2 is a small-sized wireless telephone terminal apparatus in a portable form, corresponding to each of the communication terminal apparatuses 100a, 100b, and 100c shown in FIG. 1.

Referring now to FIG. 2, the configuration of the communication terminal apparatus 100 will be described. The communication terminal apparatus 100 includes an antenna for wireless telephone antenna connected to a communication circuit that serves as a wireless communication unit. The communication circuit 102 performs wireless communication with a wireless telephone base station under control of a control unit 120.

During voice communication, audio data included in data received by the communication circuit 102 is supplied to an audio processing unit 103. Then, audio data is decoded to obtain an analog audio signal. The acquired audio signal is supplied to a speaker 104.

Furthermore, an audio signal is obtained by a microphone 105 and then supplied to the audio processing unit 103. Subsequently, the audio processing unit 103 encodes the audio signal into predetermined audio data. Then, the obtained audio data is supplied to the communication circuit 102 and transmitted by wireless communication.

These processing units, such as the communication circuit 102 and the audio processing unit 103, are able to swap control data with the control unit 120 via a control line 150 and perform transmission of respective data via a data line 160.

The control unit 120 receives operation data from an operation unit 106 having keys, a touch panel, and so on, which can be operated by the user and then performs a process instructed by the operation data.

The communication terminal apparatus 100 includes a display unit 107 constructed of an image display panel, a driving circuit thereof, and so on. The control unit 120 controls the display of the display unit 107. The display unit 107 displays a screen desired for transmission and reception when serving as a wireless telephone terminal apparatus, a screen for representation of the context of a received or transmitted electric mail, a screen for an image obtained by Internet connection, and so on, which are involved in execution of various functions of the terminal apparatus 100. The display unit 107 performs notification to the user to be used in contactless power transmission described later is carried out by the display unit 107 under control of the control unit 120.

The control unit 120 is connected to a memory 108 via the control line 150 and the data line 160 to store various kinds of data desired for the communication terminal apparatus 100 in the memory 108. In addition, a program for execution of the contactless power transmission described later is also stored in the memory 108.

Furthermore, the communication terminal apparatus 100 includes a short-range wireless communication unit 111 that perform short range communication and a short-range communication antenna 112 connected to the short-range wireless communication unit 111. The short-range wireless communication unit 111 is a processing unit that performs wireless communication with a terminal apparatus located at a distance of several meters or about 100 meters at a maximum. The short-range wireless communication may employ a generally called wireless local area network (wireless LAN), such as a short-distance wireless communication system, a Bluetooth (trademark) system, or an infrared transmission system.

In addition, the communication terminal apparatus 100 includes a processing unit for performing contactless power transmission. In other words, a contactless power-transmitting control unit 131 is connected to the control line 150. The contactless power-transmitting control unit 131 is connected to a contactless power-transmitting coil unit 132 serving as a power transmission unit and a contactless power-receiving coil unit 133 serving as a power reception unit. Under control of the contactless power-transmitting control unit 131, a process for transmitting electric power accumulated in the secondary battery 142 from the contactless power-transmitting coil unit 132 and a process for charging the secondary battery 142 using electric power received by the contactless power-receiving coil unit 133 are performed. In the case of the example of the present embodiment, a magnetic resonance system is employed to perform the power transmission from the contactless power-transmitting coil unit 132 and the power reception in the power-receiving coil unit 133. A resonant frequency at the time of power transmission from the contactless power-transmitting coil unit 132 and a resonant frequency at the time of power reception in the power-receiving coil unit 133 are variable. For example, the resonant frequency may vary in multiple stages or may vary continuously. The contactless power-transmitting control unit 131 defines the resonant frequency based on instructions from the control unit 120. In addition when the contactless power-transmitting control unit 131 controls power transmission or power reception, it performs communication with a terminal apparatus of a communication partner to perform contactless power transmission with the confirmed partner under control of the control unit 210. In addition, the resonant frequency of power transmission or power reception is also determined by communication for confirming the partner.

If the contactless power-receiving coil unit 133 receives electric power, then the contactless power-transmitting control unit 131 transmits instructions to the charge control unit 141 and then charges the secondary battery 142 using the received power. The charge control unit 141 is a processing unit that controls charging when the communication terminal apparatus 100 is connected to a battery charger (not shown) and also controls charging using the power received by the contactless power-receiving coil 133.

Furthermore, in the case of transmitting electric power from the contactless power-transmitting coil unit 132, the contactless power-transmitting control unit 131 transmits the power taken out from the secondary battery 142 to the partner's terminal apparatus. However, if the terminal apparatus 100 involved in power transmission is connected to a certain external power source, the power may be transmitted from the external power source.

The battery checker 143 is designed to measure the remaining charge amount of the secondary battery 142. The battery checker 143 sends the data of the measured remaining charge amount of the secondary battery 142 to the control unit 120. Here, the secondary battery 142 may be a lithium ion storage battery or may be any kind of power accumulation device.

Two communication terminal apparatuses 100 each having the configuration shown in FIG. 2 are prepared and one of them is on a power-receiving side and the other is on a power-receiving side. Thus, contactless power transmission between two communication terminal apparatuses 100 at a certain distance from each other can perform contactless can be performed.

In other words, as shown in FIG. 3, a communication terminal apparatus 100*a* on the power-transmitting side and a communication terminal apparatus 100*b* on the power-receiving side are prepared. Then, power transmission Pa is performed from the contactless power-transmitting coil unit 132 of the communication terminal apparatus 100*a* on the power-transmitting side to the contactless power-receiving coil unit 133 of the communication terminal apparatus on the power-receiving side. In this embodiment, when contactless power transmission Pa is performed, wireless communication is performed using the wireless communication circuits 102 of the respective communication terminal apparatuses 100*a* and 100*b* to make a connection between the communication terminal apparatus 100*a* on the power-transmitting side and the communication terminal apparatus 100*b* on the power-receiving side through a wireless communication network via a base station BS. Then, the instructions about conditions for power transmission are transmitted from the communication terminal apparatus 100*a* on the power-transmitting side to the communication terminal apparatus 100*b* on the power-receiving side to perform contactless power transmission therebetween under the instructed conditions.

[1.3. Exemplary Process for Power Transmission Performed Between Two or More Terminal Apparatuses in First Embodiment]

Referring next to the flow chart shown in FIG. 4, a concrete example of a process for contactless power transmission between the communication terminal apparatus 100*a* on the power-transmitting side and the communication terminal apparatus 100*b* on the power-receiving side will be described. In the flow chart shown in FIG. 4, steps S11 to S20 on the left side of the figure are provided for the process performed in the communication terminal apparatus 100*a* on the power-transmitting side and the steps S21 to S28 on the right side of the figure are provided for the process performed in the communication terminal apparatus 100*b* on the power-receiving side. The processes in the communication terminal apparatuses 100*a* and 100*b* are carried out under control of their control units 120, respectively.

First, in the communication terminal apparatus 100*a* on the power-transmitting side, a process for searching a partner to whom power transmission is desired (step S11). Here, for example, using a phone book function or the like prepared for a telephone terminal, the phone number or the like of the registered user's terminal to specify the partner's terminal apparatus. Alternatively, if the partner is an unregistered one, then the user may input the partner's phone number and so on into the user's terminal apparatus. If the partner for power transmission is determined, then the amount of power to be transmitted is input into the user's terminal device (step S12). The amount of power may be input while being converted into the rate of the remaining amount of the battery as described later.

Subsequently, the control unit 120 of the communication terminal apparatus 100*a* carries out display of confirming the start of power transmission on the display unit 106 to determine whether a confirming operation is performed using such a displayed screen (step S13). For example, the display unit 106 displays "Do you wish to perform power transmission?". If the user's operation selects "Yes", an electronic power transmission program is performed. If the user's operation selects "No", then the process is ended.

If step S13 determines that it is instructed to start power transmission, then contactless communication to a base station is performed using the communication circuit 102 to carry out a communication process that makes a call to the partner's terminal apparatus 100*b* selected at step S11 via the wireless telephone network (step s14). At this time, data about the conditions of power transmission is transmitted via the wireless telephone network. The conditions of power transmission include data of resonant frequency f1 for power transmission from the contactless power-transmitting coil unit 132. Here, the contactless power-transmitting coil unit 132 may also transfer other conditions, such as the amount of power to be transmitted and time period of power transmission.

If the conditions of power transmission are transmitted, then the contactless power-transmitting control unit 131 of the communication terminal apparatus 100*a* starts power transmission from the contactless power-transmitting coil unit 132 at resonant frequency f1 (step S15).

The communication terminal apparatus 100*b* on the power-receiving side receives an incoming call from the wireless telephone network (step S21) and obtains the conditions of power transmission, such as resonant frequency f1, from the data via the incoming line (step S22).

If the communication terminal apparatus 100*b* acquires the data of resonant frequency f1, then the contactless power-transmitting control unit 131 thereof adjusts the resonant frequency for power reception in the contactless power-receiving coil unit 133 to the instructed resonant frequency f1, thereby initiating the power transmission (step S23). The start of power reception permits the communication terminal apparatus 100*b* on the receiving side to receive electric power transmitted in step S15 and then starts charging of the secondary battery 142 in the apparatus 100b.

In the contactless power-transmitting control unit 141 in the communication terminal apparatus 100b on the power-receiving side determines whether the charging of the secondary battery 142 by the power reception is started (step S24). If this determination does not detect the start of power reception, then the communication terminal apparatus 100b transmits a charging error to its partner's communication terminal apparatus 100a through the connected wireless telephone line. After transmitting the charging error, the wireless telephone line is cut off (step S28) and the process is ended. If the charging error occurs, the display unit 107 of the communication terminal device 100b on the power-receiving side may notify the user of such an error.

After determining that the power reception is started in step S24, the communication terminal device 100b on the power-receiving side informs the partner's communication terminal device 100a of a fact that the secondary battery 142 is on charge with the received power, followed by cutting off the wireless telephone line (step S25).

The communication terminal apparatus 100a on the transmission side cuts off the wireless telephone line after receiving the response from the power-receiving communication terminal apparatus 100b (step S16). Then, the communication terminal apparatus 100a determines whether the received response is "on charge" (step S25) or "charge error (step S28) (step S17).

In this step, if it is determined that the charge error occurs, then the power transmission is terminated. At this time, "stopping power transmission" may be displayed on the display unit 107. If it is determined that the charging is going on, then the battery checker 143 measures the remaining power amount of the battery is measured and monitors the amount of transmitted power (step S18). It is determined whether the monitored amount of transmitted power reaches a predetermined amount of transmitted power defined in step S12 (step S19), then the power transmission is ended when reached (step S20). Also, "power transmission ended" may be displayed on the display unit 107 when the amount of transmitted power reaches the predetermined level and the power transmission is ended.

On the other hand, in the communication terminal apparatus 100b on the power-receiving side, it is determined whether the contactless power-transmitting control unit 131 keeps on receiving power even after transmitting the message "on charge" in step S25 (step S26). This determination is repeated as long as the charging by the power reception is continued. Furthermore, if it is determined that the power reception is stopped, then the contactless power-transmitting control unit 131 halts the power reception of the contactless power-receiving coil unit 133 and the charging by the power reception (step S27). If the charging by the power reception is ended, then the message "charging ended" may be displayed on the display unit 107.

FIG. 5 and FIG. 6 illustrate screens displayed on the display unit 106 of the communication terminal apparatus 100a on the power-transmitting side, respectively.

FIG. 5 is an exemplary display when the partner and the amount of transmitted power are determined in steps S11 and S12 of the flow chart shown in FIG. 4.

As shown in FIG. 5, the display unit 106 displays the telephone number and the registered designation (name) of the partner's terminal apparatus, and the amount of power to be transmitted. The amount of power to be transmitted may be represented by the percentage of battery capacity. For example, it may be represented by "donate up to XX % of battery capacity".

FIG. 6 is an exemplary display based on the remaining power of the battery (the remaining amount of power storage) when the communication terminal apparatus 100a starts power transmission from the communication terminal apparatus 100a on the power-transmitting side. The display shown in FIG. 6 represents a notice that notifies the user of a comparatively small remaining amount of the secondary battery 142 in the communication terminal apparatus 100a on the power-transmitting side when the power transmission is completed.

In FIG. 6, in other words, the display represents a message of "The remaining capacity of this mobile phone is 30% or less. Do you still donate?" to urge the user to confirm that power transmission has priority even when the remaining capacity of its own terminal is not larger than a predetermined remaining amount of the own terminal. The notice on the display is not only generated when the power transmission is started but also generated in the case of a decrease in remaining battery power when any operation is performed in the terminal device on the power-transmitting site during the period of power transmission.

Therefore, the communication terminal apparatus on the power-transmitting side sends a call to the communication terminal apparatus on the power-receiving side to adjust the resonant frequency of the latter apparatus to be equal to that of the former, followed by performing contactless power transmission. As a result reliable power transmission between specified terminal apparatuses can be performed.

In other words, already as shown in FIG. 1, the contactless power transmission from the communication terminal apparatus 100a to the communication terminal apparatus 100b can be performed, while the power is not transmitted to another communication terminal apparatus 100c in the power transmissible area Ab. It is noted that the resonant frequency defined using such a wireless telephone network may be preferably different from one used in the contactless power transmission which is not carried out by the process of the present embodiment. In this way, the resonant frequency of the communication terminal apparatuses 100a and 100b can be surely prevented from corresponding to the resonant frequency of another communication terminal apparatus 100c.

[2.1. Exemplary Configuration of Head Set According to Second Embodiment]

Hereinafter, an example of a second embodiment of the present invention will be described with reference to FIG. 7 to FIG. 10. In these figures, structural components corresponding to those described in the first embodiment will be designated by the same reference numerals as those in FIG. 1 to FIG. 6.

In this embodiment, a communication terminal apparatus 100 and a headset 200 are prepared and designed to perform contactless power transmission between them.

The configuration of the communication terminal apparatus 100 is the same as one which has been described in the first embodiment with reference to FIG. 2. In the present embodiment, however, a short-range wireless communication unit 111 of the communication terminal apparatus 100 is designed to directly perform wireless communication with a specified communication partner previously registered using the Bluetooth (trademark) system.

Here, the term "direct wireless communication" means that wireless communication is performed without passing through a base station. They can perform wireless communication as long as they are located within a distance of several meters or about 100 meters at a maximum.

Referring now to a block diagram shown in FIG. 7, the configuration of the head set 200 will be described.

The head set 200 is an apparatus that performs two-way wireless transfer of audio data with a partner's terminal apparatus (communication terminal apparatus 100) using the Bluetooth wireless communication. Specifically, the head set 200 is attached on the head or the like of the user and collects voice spoken by the user and brings the partner's voice into the ears of the user.

The head set 200 is provided with a short-range wireless communication unit 221 connected with a short-range wireless communication antenna 222. The short-range wireless communication unit 221 is a communication processing unit which is designed to directly perform wireless communication with a specified communication partner previously registered using the Bluetooth (trademark) system. Here, the term "specific partner" is one that serves as a communication terminal apparatus 100 having the same configuration as one shown in FIG. 2.

During voice communication, audio data included in data received by the short-range wireless communication unit 221 is supplied to an audio processing unit 201. Then, audio data is decoded to obtain an analog audio signal. The acquired audio signal is supplied to a speaker 202. For example, the speaker 202 may be one built in an earphone to be attached near the ears of the user.

Furthermore, an audio signal is obtained by a microphone 203 that collects voice spoken by the user. Then, the audio signal is supplied to the audio processing unit 201. Subsequently, the audio processing unit 201 encodes the audio signal into predetermined audio data. Then, the obtained audio data is supplied to the communication circuit 221 and transmitted by wireless communication.

These processing units, such as the short-distance communication unit 221 and the audio processing unit 201, are able to swap control data with the control unit 210 via a control line 250. In addition, these processing units perform transmission of respective data via a data line 260.

The control unit 210 receives operation data from an operation unit 206 operated by the user and then performs a process instructed by the operation data.

The head set 200 includes a display unit 204 constructed of various kinds of pilot lamps and so on. The control unit 210 controls the display of the display unit 204. For example, the display unit 204 may display a fact that the reception of power from a contactless power transmission is performed as described later under control of the control unit 210.

The control unit 210 is connected to a memory 205 via a control line 250 and a data line 260 to store various kinds of data which can be used in the head set 200. The memory 205 also stores a program for execution of the contactless power transmission described later.

The short-range wireless communication unit 221 may perform short-range wireless communication using any communication system other than the Bluetooth system. The short-range wireless communication may employ a generally called wireless local area network (wireless LAN), such as a short-distance wireless communication system or an infrared transmission system.

In addition, the head set 200 includes a processing unit for performing contactless power transmission. In other words, a contactless power-transmitting control unit 232 is connected to the control line 250. The contactless power-transmitting control unit 232 is connected to a contactless power-receiving coil unit 231 serving as a power reception unit. Furthermore, a process for charging a secondary battery 234 using electric power received by the contactless power-receiving coil unit 231 is carried out under control of the contactless power-transmitting control unit 232. In the case of the example of the present embodiment, the power reception by the contact power-receiving coil unit 231 is performed using a magnetic resonance system. The resonant frequency of the contactless power-receiving coil unit 231 at the time of power reception is variable. For example, the resonant frequency may vary in multiple stages or may vary continuously. The contactless power-transmitting control unit 131 defines the resonant frequency based on instructions from the control unit 120. In addition when the contactless power-transmitting control unit 232 controls power reception, it performs communication with a terminal apparatus of a communication partner to perform contactless power transmission with the confirmed partner under control of the control unit 210. In addition, the resonant frequency of power transmission is also determined by communication for confirming the partner.

If the contactless power-receiving coil unit 231 receives electric power, then the contactless power-transmitting control unit 232 transmits instructions to the charge control unit 233 and then charges the secondary battery 234 using the received power. The charge control unit 233 is a processing unit that controls charging when the head set 200 is connected to a battery charger (not shown) and also controls charging using the power received by the contactless power-receiving coil 231.

The battery checker 235 is designed to measure the remaining charge amount of the secondary battery 234. The battery checker 235 sends the data of the measured remaining charge amount of the secondary battery 234 to the control unit 210. Here, the secondary battery 234 may be a lithium ion storage battery or may be any kind of power accumulation device.

[2.2. Exemplary Process of Second Embodiment]

Referring now to FIG. 8 and FIG. 9, an exemplary process of the present embodiment will be described.

In the present embodiment, as shown in FIG. 8, the wireless communication terminal 100 (mobile phone terminal 100) and the head set 200 are closed to each other within an area where they can communicate with each other in a contactless manner. Furthermore, the electric power charged in the secondary battery 142 of the wireless communication terminal 100 is transmitted to the head set 200 by contactless power transmission to charge the second battery 234. At this time, the wireless communication terminal 100 and the head set 200 perform a process for synchronizing their resonant frequencies of wireless by performing wireless communication with each other using the short-range wireless communication units 111 and 221, respectively.

A flow chart shown in FIG. 9 illustrates an example of a state where power transmission is performed between the wireless communication terminal 100 and the head set 200. In FIG. 9, the process performed in the wireless communication terminal 100 includes steps S41 to S49 illustrated on the left side and the process performed in the head set 200 includes steps S31 to S39.

Here, the process will be described with reference to FIG. 9. First, the head set 200 starts a process for monitoring a remaining amount of battery and determines whether the remaining amount of the secondary buttery 234 is small (step S31). Here, if there is an enough remaining amount of the secondary battery, then the determination is repeated at any time.

If it is determined that the remaining amount of the secondary battery is small, then a message representing that the remaining amount of the secondary battery is small is transmitted to the communication terminal apparatus 100 which is a partner of audio data transmission in wireless communication using the short-range wireless communication unit 221 (step S32). After that, a process for waiting a response to the wireless communication is performed. It is determined whether the process is time out as a predetermined time passes (Step S33). If it is timing out, the process in this step is terminated. Then, the request of charging is notified by the display on the display unit 204 or sounds from the speaker 202 (step S34).

On the other hand, the communication terminal apparatus 100 which has received the message in step S32 starts a power distribution operation and notifies the user of an insufficient remaining amount of the secondary battery in the head set by display on the display unit 107 or audio output from the speaker 104 of the communication terminal apparatus 100 (step S41). Then, the user who has confirmed this notification is allowed to select whether a process for dividing the power is performed (step S42). If the user selects that the power is not divided, then this fact is informed to the head set 200 by short-range wireless communication (step S43). The head set 200 which is informed of this notification sends out a message alerting the requirement of charging in step S34 even before timing out of the step S33 has been timed out.

In step S42, furthermore, if the user selects the process for dividing the power, then the short-range wireless communication is employed to inform the head set 200 the power transmission will now be performed (step S44). At this time, the head set 200 is informed of a resonant frequency for power transmission. Subsequently, the power transmission is started with the informed resonant frequency (step 45). In the head set 200 that has received data including the data of resonance frequency, a process for contactless power reception at the instructed resonant frequency (step S35) and a process for charging of received power (step S36) are started.

After starting the power transmission, in the communication terminal apparatus 100, the battery checker 143 monitors the amount of transmitted power (step S46) and then determines whether the amount of transmitted power in contactless power transmission reaches a setting value (step S47). If it is determined that the amount of transmitted power does not reach the setting value, then the head set 200 determines whether the data about the completion of charging is transmitted (step S48). If such a determination also indicates that the charging is not completed, then the process returns to step S46 for monitoring the amount of transmitted power.

If the amount of transmitted power reaches the setting value in step S47 and the charging is completed in step S48, then the power transmission for contactless charging is stopped (step S49).

If the head set 200 starts power reception in step S36, then it is determined whether the secondary battery is fully charged (step S37). It is not fully filled, then it is determined whether the power reception is stopped (step S38). If the power reception is not stopped, then the process returns to the determination in step S37. If these determination steps determine that the battery is fully charged or the power reception is completed, then the charging of the secondary battery is stopped (step S39). Furthermore, if the charging is stopped, then the communication terminal apparatus 100 is informed of such a fact through short-range wireless communication. Therefore, according to the example of the present embodiment, if the remaining power of the battery in the head set 200, which is used in combination with the communication terminal apparatus 100, a process for making their resonant frequencies coincide with each other to perform contactless power transmission. Thus, contactless charging can be performed, effectively.

Here, step S42 of the flow chart shown in FIG. 9 allows the user to select whether the contactless charging is started. In contrast, if the remaining power of the battery of the communication terminal apparatus 100 is equal to or more than a predetermined level due to a decrease in remaining power of the secondary battery of the head set 200, the contactless charging may be automatically started. When automatically starting the contactless charging, the user may be notified of such a fact by a sound, instruction, or the like.

Furthermore, the example of the second embodiment has been described so that electric power is transmitted from the communication terminal apparatus 100 to the head set 200. Alternatively, the power transmission may be performed from the head set 200 to charge the communication terminal device 100 when the remaining power of the secondary battery of the communication terminal apparatus 100 runs short.

[2.3. Exemplary Configuration of Third Embodiment]

Hereinafter, an example of a third embodiment of the present invention will be described with reference to FIG. 10 and FIG. 11. In the example of the third embodiment, just as in the case with the second embodiment, a communication terminal apparatus 100 and a headset 200 are prepared and designed to perform short-range wireless communication of audio data between them when performing voice call or the like.

In the second embodiment, the power transmission is performed from the communication terminal apparatus 100 to the head set 200. In contrast, in the example of the present embodiment, short-range wireless communication between the communication terminal apparatus 100 and the head set 200 is performed. Thus, the communication terminal apparatus 100 controls the power reception of the head set 200, while contactless power transmission can be performed from another charging pod 300.

The configurations of the communication terminal apparatus 100 and the head set 200 of the example of the present embodiment are same as those illustrated in FIG. 2 and FIG. 7, respectively.

FIG. 10 is a diagram illustrating an exemplary configuration of a charging pod 300 to be used in the example of the present invention. The charging pod 300 includes a contactless power-transmitting coil unit 301 that serves as a power-transmitting unit and a contactless power-transmitting unit 302 that controls the transmission of power from the contactless power-transmitting coil unit 301. The electric power to be transmitted is one supplied from a power source unit 303 obtained from any of various kinds of power sources, such as a commercial AC power source or an automotive power source.

Alternatively, the power source unit 303 may include a large capacity secondary battery or a solar battery.

A resonant frequency for power transmission from the contactless power-transmitting coil unit 301 may be determined by short-range wireless communication, wire communication, or the like with the communication terminal apparatus 100. In this case, the charging pod 300 may be desirably provided with a function of short-distance wireless communication, wire communication function, or the like. Alternatively, a specific resonant frequency may be previously defined so that the charging pod 300 can be provided for a specific communication terminal apparatus to supply electric current to only the charging pod.

[3. Exemplary Process of Third Embodiment] (FIG. 11)

Figure 11:
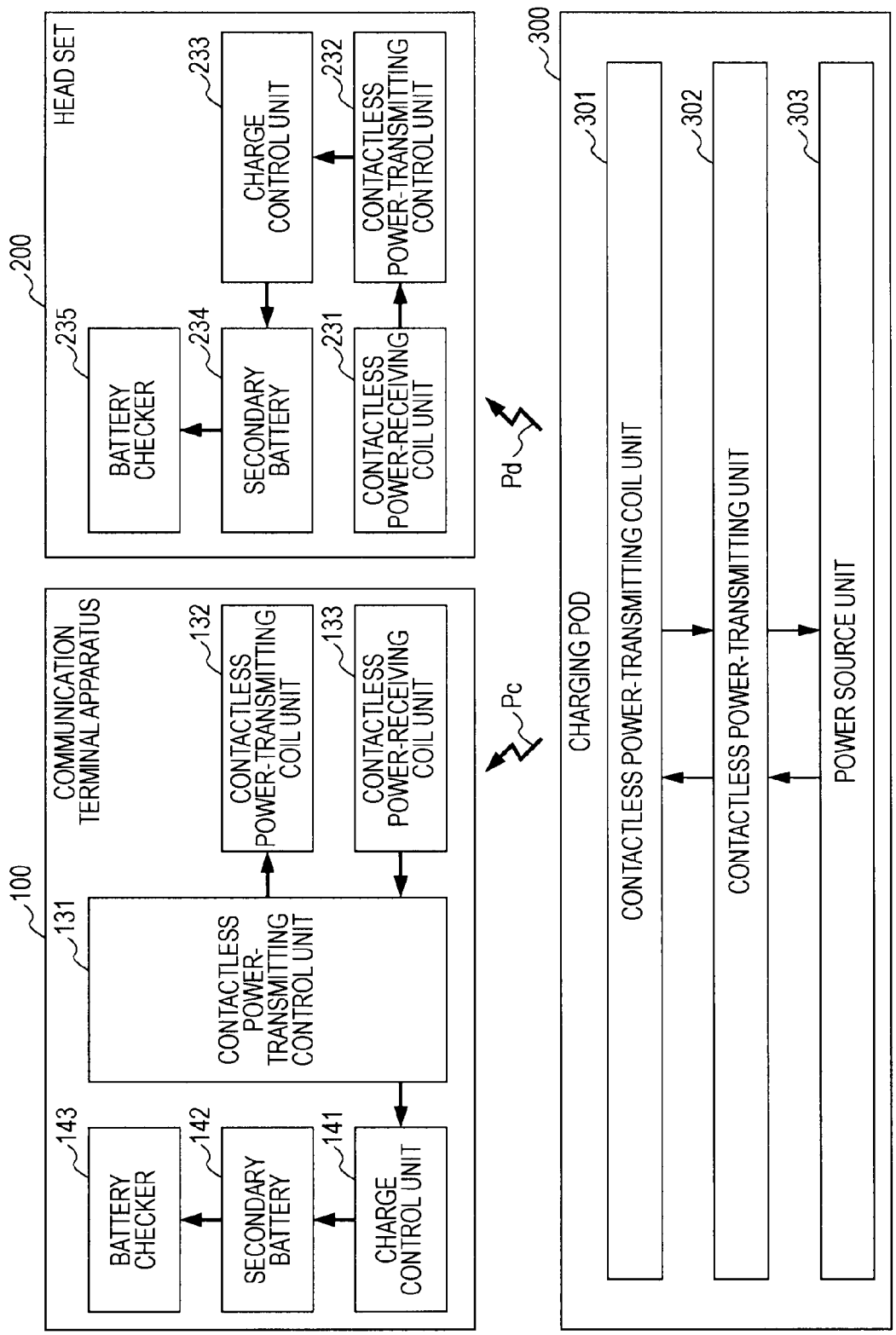
FIG. 11 is an explanatory diagram illustrating a power transmission state among the terminal apparatus, head set, and charging pod according to the third embodiment of the present invention.

FIG. 11 is a diagram illustrating an exemplary process of the present embodiment.

In this example of the embodiment, if the communication apparatus 100 determines that the head set 200 has an insufficient remaining power of the battery through short-range wireless communication, the power transmission is started at a specific resonant frequency from the charging pod 300. Then, the contactless power-receiving coil unit 231 of the head set 200 receives electric power. In this way, as shown in FIG. 11, the contactless power transmission Pd is started.

At this time, a resonant frequency received by the head set 200 is instructed from the communication terminal apparatus 100 through the short-range wireless communication.

At this time, simultaneously, the contactless power-receiving coil unit 133 of the communication terminal apparatus 100 may perform contactless power transmission Pc as shown in FIG. 11 while performing the power reception at the same resonant frequency as one received by the head set 200.

In this way, the contactless charging of the head set 200 can be efficiently performed by carrying out the contactless charging of the head set 200 by power transmission from the charging pod 300 based on an instruction from the communication terminal apparatus 100. To the short-range wireless communication between the communication terminal apparatus 100 and the head set 200 perform the transmission of instructions of starting or ending the power transmission, for example, the process described in the second embodiment with reference to the flow chart of FIG. 9 is applied.

[4. Modified Example]

In any of the aforementioned embodiments, power transmission between the communication terminal apparatuses that sere as wireless telephone terminals, a power transmission between the communication device and the head set, or the power transmission using a charge pot have been described. Alternatively, any of the aforementioned embodiments may be applied to power transmission between other functions. For example, the head set may be prepared as one free of a microphone.

Furthermore, for example, as shown in FIG. 12, wireless communication Wb using short-distance wireless communication or wireless communication network may be performed between a computer apparatus 400 and a communication terminal apparatus 100 and the power transmission Pe may be then performed from the computer apparatus 400 to the communication terminal apparatus 100.

In addition, any of other electronic apparatuses may be employed as a power-transmitting side or a power-receiving side.

Although the aforementioned first embodiment a wireless telephone network is employed in connection between the power-transmitting side communication terminal apparatus and the power-receiving side communication terminal apparatus. Alternatively, various kinds of processes may be applied to the form of data. For example, a telephone line connected to the wireless telephone network is used for transmitting data of power-transmission conditions as data over voice grade telephone lines. Alternatively, using another band for data transmission other than audio data, data of power-transmission conditions may be transmitted as data which can be identified by the communication terminal apparatus on the power-receiving side. In addition, data of power-transmission conditions may be added to control data for telephone lines. Furthermore, it may be provided as data included in E-mail and then transmitted to the communication terminal apparatus on the power-receiving side.

Alternatively, in the case of applying a short-range wireless communication like the example of the second embodiment, any short-range wireless communication system other than the Bluetooth system may be applied.

Furthermore, in the example of the first embodiment, the amount of power to be transmitted is specified. Alternatively, the remaining power level or ratio of battery of its own terminal apparatus or the amount of power to be transmitted may be specified. In the example of the first embodiment, the description has been made for power transmission from a single communication terminal apparatus to another single communication terminal apparatus. Alternatively, two or more communication terminal apparatuses may be placed on the power-receiving side. The transmission conditions, such as a resonant frequency, may be transmitted to each of the communication terminal apparatuses on the power-receiving side to allow two or more terminal apparatuses on the power-receiving side to simultaneously receive electric power.

In the example of the first embodiment, furthermore, each of the terminal apparatuses may be constructed as one provided with a power-transmission function and a power-reception function. Alternatively, the terminal apparatus on the power-transmitting side may be not provided with any power-receiving function. Simultaneously, the terminal apparatus on the power-receiving side may be not provided with any power-transmitting function.

Furthermore, to each of the embodiments, the terminal apparatus that performs power supply in magnetic resonance system is applied. Alternatively, another kind of contactless power supply may be applied. For example, in the case of using an electromagnetic induction system in power transmission between the power-transmitting coil and the power-receiving coil located in close proximity to each other, wireless communications are performed between the communication terminal apparatuses to transmit power transmission conditions. Then, power transmission and power reception corresponding to such conditions are performed, so that contactless power supply may be carried out only between specific terminal apparatuses.

It should be understood by those skilled in the art that various modifications, combinations, sub-combinations and alterations may occur depending on design requirements and other factors insofar as they are within the scope of the appended claims or the equivalents thereof.

What is claimed is:

1. A communication terminal comprising:
   a wireless communication interface configured to communicate with another communication terminal;
   a battery;
   a display;
   a contactless power transmitting coil; and
   circuitry configured to
      control the display to display at least one of a phone number or registered name of a user corresponding to the another communication terminal together with an amount of power to be transmitted to the another communication terminal;
      control the display to display a notice when an amount of power remaining in the battery is below a predetermined threshold, the notice prompting a user input confirming that power should still be transmitted to the another communication terminal even though the amount of power remaining in the battery is below the predetermined threshold;

control transmission of contactless electric power to the another communication terminal by the contactless power transmitting coil at a predetermined resonance frequency; and control the wireless communication interface to transmit, to the another communication terminal, an instruction indicating the predetermined resonance frequency for receiving the contactless electric power transmitted from the contactless power transmitting coil.

2. The communication terminal of claim 1, wherein the wireless communication interface is configured to communicate with the another communication terminal via a base station of a wireless communication network.

3. The communication terminal of claim 1, wherein the wireless communication interface is configured to communicate with the another communication terminal via a short-range wireless link.

4. The communication terminal of claim 3, wherein the short range wireless link is a wireless local area network (LAN) link, a near field communications (NFC) link, a Bluetooth link or an infrared link.

5. The communication terminal of claim 1, wherein the contactless power transmitting coil is configured to transmit the contactless electric power at a plurality of resonance frequencies that vary in multiple stages over time.

6. The communication terminal of claim 5, wherein the circuitry is configured to control the wireless communication interface to transmit information indicating the plurality of resonance frequencies and the timing at which they vary in multiple stages over time as the instruction.

7. The communication terminal of claim 1, wherein the contactless power transmitting coil is configured to transmit the contactless electric power at a plurality of resonance frequencies that vary continuously over time.

8. The communication terminal of claim 7, wherein the circuitry is configured to control the wireless communication interface to transmit information indicating the plurality of resonance frequencies and the timing at which they continuously vary over time as the instruction.

9. The communication terminal of claim 1, further comprising:

a power receiving unit configured to receive contactless electric power.

10. The communication terminal of claim 9, wherein the circuitry is configured to control a resonance frequency of the power receiving unit based on an instruction received via the wireless communication interface.

11. The communication terminal of claim 1, wherein the another terminal is one of a mobile telephone, a wireless headset and a notebook personal computer (PC).

12. A power transfer method performed by a communication terminal, the method comprising:

displaying at least one of a phone number or registered name of a user corresponding to another communication terminal to which power is transmitted from the communication terminal together with an amount of power to be transmitted to the another communication terminal;

displaying a notice when an amount of power remaining in a battery of the communication terminal is below a predetermined threshold, the notice prompting a user input confirming that power should still be transmitted to the another communication terminal even though the amount of power remaining in the battery is below the predetermined threshold;

transmitting, from a wireless communication interface of the communication terminal to another communication terminal, an instruction indicating a predetermined resonance frequency for receiving contactless electric power transmitted from a contactless power transmitting coil of the communication terminal; and transmitting, by the contactless power transmitting coil of the communication terminal, contactless electric power to the another terminal at the predetermined resonance frequency in accordance with the instruction.

13. The method of claim 12, wherein the contactless power is transmitted from the contactless power transmitting coil at a plurality of resonance frequencies that vary in multiple stages over time.

14. The method of claim 12, wherein the contactless power is transmitted from the contactless power transmitting coil at a plurality of resonance frequencies that vary continuously over time.

15. The method of claim 12, further comprising:

receiving, at a power reception unit of the communication terminal, contactless electric power.

16. The communication terminal of claim 1, wherein the circuitry is configured to control the display to display the phone number corresponding to the another communication terminal together with the amount of power to be transmitted to the another communication terminal.

17. The communication terminal of claim 1, wherein the circuitry is configured to control the display to display the registered name of the user corresponding to the another communication terminal together with the amount of power to be transmitted to the another communication terminal.

* * * * *